Sept. 11, 1956     R. J. HOPKINS     2,762,492
PORTABLE EXTENSIBLE MINE CONVEYOR
Filed Dec. 29, 1950     3 Sheets-Sheet 1
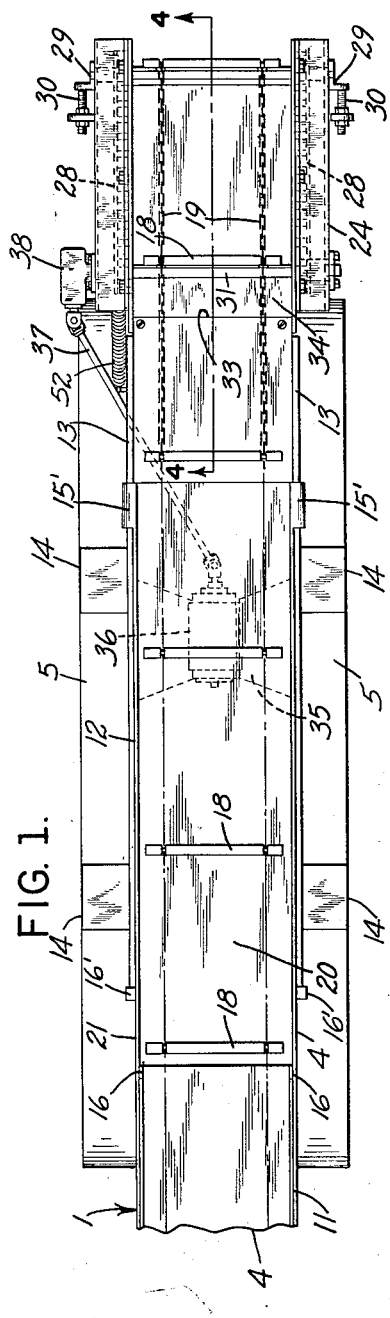
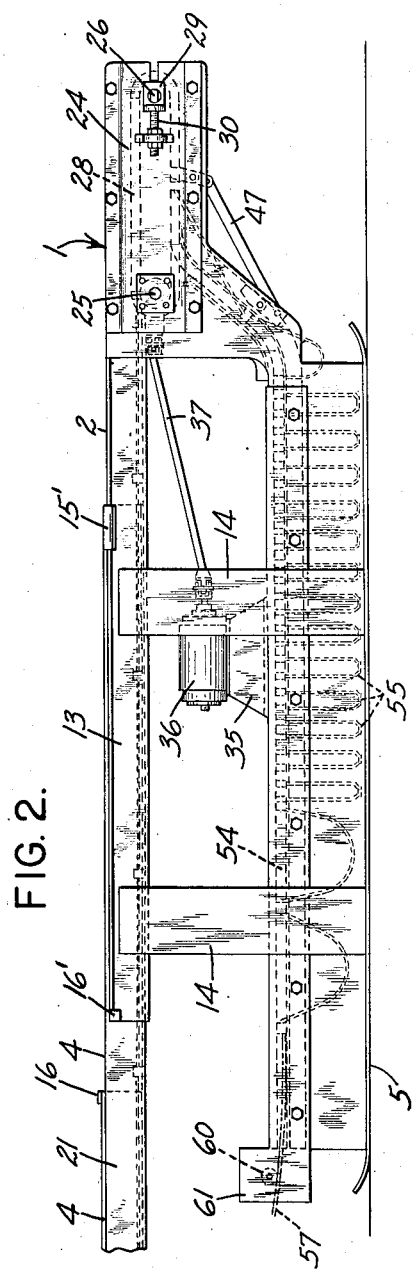
INVENTOR:
RICHARD J. HOPKINS
BY Charles F. Osgood,
ATTORNEY Sept. 11, 1956 R. J. HOPKINS 2,762,492
PORTABLE EXTENSIBLE MINE CONVEYOR
Filed Dec. 29, 1950 3 Sheets-Sheet 2
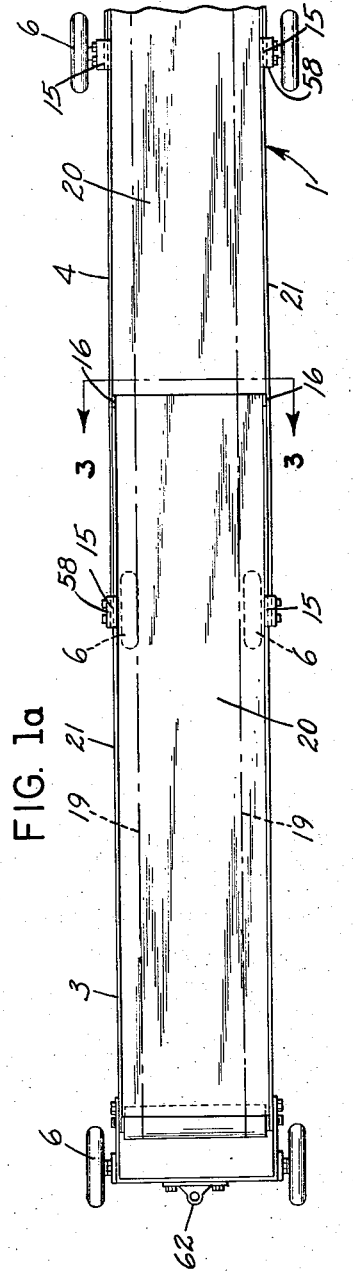
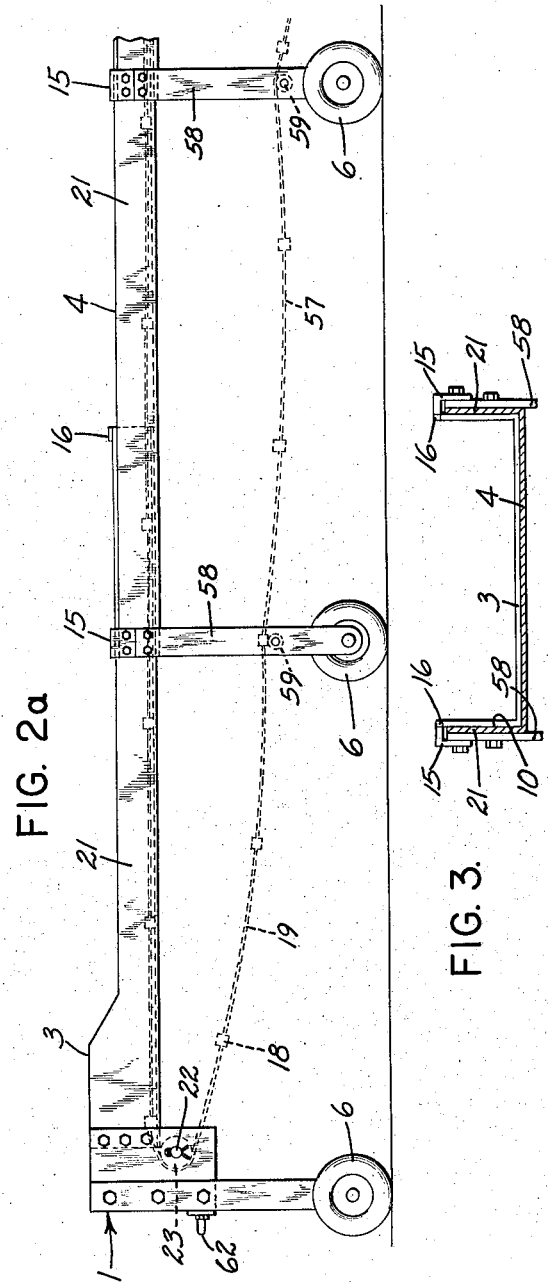
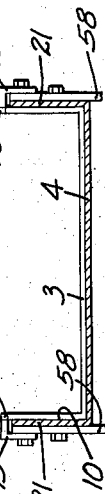
INVENTOR:
RICHARD J. HOPKINS
BY Charles F. Osgood
ATTORNEY Sept. 11, 1956 R. J. HOPKINS 2,762,492
PORTABLE EXTENSIBLE MINE CONVEYOR
Filed Dec. 29, 1950 3 Sheets-Sheet 3

INVENTOR:
RICHARD J. HOPKINS
BY Charles F. Osgood
ATTORNEY

United States Patent Office 2,762,492
Patented Sept. 11, 1956

2,762,492

PORTABLE EXTENSIBLE MINE CONVEYOR

Richard J. Hopkins, Franklin, Pa., assignor to Joy Manufacturing Company, Pittsburgh, Pa., a corporation of Pennsylvania Application December 29, 1950, Serial No. 203,343

6 Claims. (Cl. 198—139)

This invention relates to conveyor mechanisms and more particularly to a portable extensible conveyor mechanism especially designed for use in underground coal mines or the like.

In coal mining, in accordance with modern high speed methods, it is desirable to have the receiving end of the conveyor mechanism closely follow the loading machine as mining and loading progresses, while the discharge end of the conveyor mechanism remains relatively stationary at a suitable point of delivery so that discharge may be effected onto the main entry conveyor, into shuttle cars or other transportation means of the mine. The present invention contemplates improvements over known types of mine conveyors in that the conveyor frame structure is extensible and the endless conveyor element is guided along the relatively extensible parts of the conveyor frame and is so arranged and constructed that as the frame sections are extended, the effective upper run of the conveyor is extended therewith. The endless conveyor of the present invention is of sufficient maximum length to move with the frame parts into the completely extended position of the conveyor mechanism, and as the parts are collapsed during shortening of the conveyor length, the slack portion of the return run of the endless conveyor is piled up or stored within the conveyor mechanism in a novel manner. Also, in accordance with the present invention, the stored up slack portion of the return run of the conveyor is compactly arranged in loops or bights, and feeding devices and guiding means are provided within the conveyor mechanism whereby the flights of the loose conveyor portions are fed and effectively guided as they move into their stored up relation.

An object of the present invention is to provide an improved conveyor mechanism. Another object is to provide an improved portable extensible conveyor mechanism especially designed for use in underground coal mines or the like. A further object is to provide an improved extensible conveyor mechanism of the endless flight type having improved means for storing up the flights of the slack return run of the endless conveyor and for feeding and guiding the conveyor flights as they are moved into their stored up position. These and other objects and advantages of the invention will, however, hereinafter more fully appear in the course of the following description.

In the accompanying drawings there is shown for purposes of illustration one form which the invention may assume in practice.

In these drawings:

Figs. 1 and 1a, taken together, constitute a plan view of an extensible conveyor mechanism constructed in accordance with a preferred illustrative embodiment of the invention.

Fig. 2 and 2a, taken together, constitute a side elevational view of the conveyor mechanism shown in Figs. 1 and 1a.

Fig. 3 is an enlarged cross section taken on line 3—3 of Fig. 1a.

Figure 4:
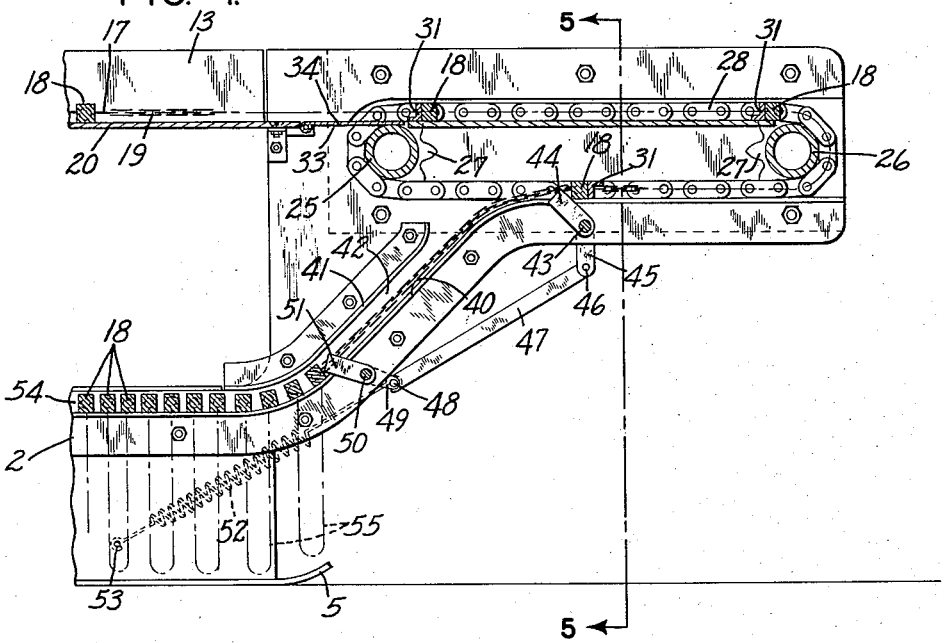
Fig. 4 is an enlarged longitudinally vertical section taken on line 4—4 of Fig. 1.
Figure 5:
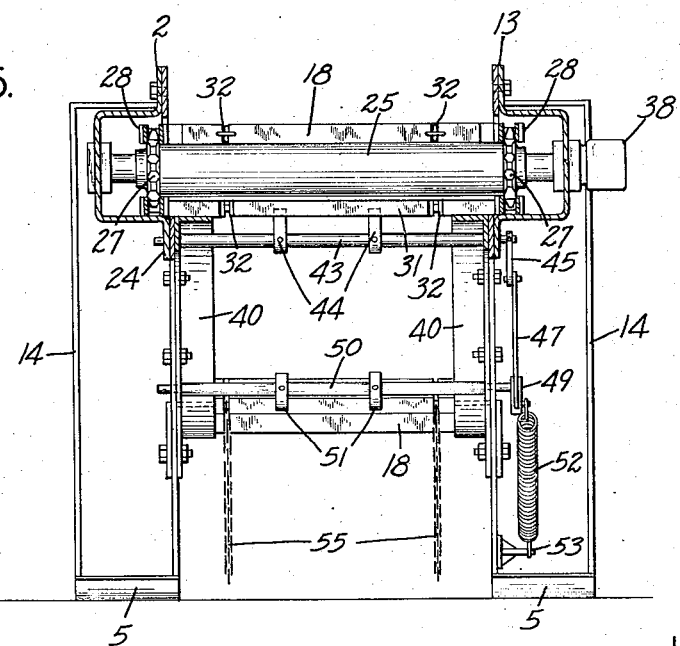
Fig. 5 is a cross section taken on line 5—5 of Fig. 4.

In this illustrative embodiment of the invention the improved extensible conveyor mechanism is generally designated 1 and, as shown in the drawings, generally comprises a rear discharge or delivery section 2, a front receiving section 3 and a series of intermediate sections 4, the latter having longitudinal sliding guided engagement with the end sections 2 and 3 and with each other, whereby the conveyor mechanism may be extended or contracted as desired to vary its effective length. The discharge end section 2 is mounted on bottom skids 5 slidable freely over the floor of a mine while the intermediate and front end sections are mounted on rubber-tired wheels 6, which are adapted to travel over the mine floor as the conveyor frame sections are extended or contracted. Evidently, the rear discharge section 2 may be mounted on wheels or other mobility providing means such as a crawler base, and the receiving and intermediate sections may be skid mounted or otherwise supported.

In this improved construction the front end section 3 is slidingly guided at 10 in telescopic relation with the adjacent intermediate section 4, and the intermediate sections 4 have similar sliding telescopic guided relation at 11. The rear intermediate section is slidingly guided in telescopic relation at 12 within an upper horizontal frame 13 of the rear discharge section 2. The upper horizontal frame 13 is supported by uprights 14 on the bottom skids 5. The several telescopically arranged conveyor frame sections are maintained against relative vertical displacement by suitable retaining brackets 15, and each sliding section has an end abutment 16 which is engageable with the bracket on the adjacent section to prevent axial separation of the telescopic parts. It will be noted that on the rear discharge section 2 and the cooperating intermediate section 4, the guide brackets 15' and abutments 16' are reversed with respect to those on the other sections, thereby to enable the frame sections to be collapsed with respect to the frame 13 in a compact manner. The conveyor frame sections are provided with suitable longitudinal guideways for guiding the upper run of an endless flight conveyor 17 which has spaced cross bars or flights 18 connected together by loose side chain sections 19, and the several frame sections have horizontal bottom plates 20 along which the conveyor flights 18 move for conveying the loose material such as loose coal received by the front receiving section of the conveyor mechanism. The bottom plates between the adjacent frame sections overlap in a suitable manner to prevent spillage of material between the sections, and the telescopic frame sections have upright sides 21 which cooperate with the bottom plates to provide an elongated trough-like structure within which the upper run of the conveyor moves. The forward end of the receiving section 3 has a transverse shaft 22 journaled thereon and this shaft carries a guide roller 23 about which the endless conveyor is adapted to pass.

Now referring to the driving means for the endless conveyor 17 it will be noted that the delivery end 24 of the upper frame of the rear discharge section 2 has parallel transverse shafts 25 and 26 suitably journaled on the sides thereof and these shafts carry sprockets 27 which engage and drive endless side chains 28. The rear shaft 26 is mounted in adjustable slide blocks 29 which are adjustable by screws 30 whereby the distance between the shaft axes may be varied thereby to place the side drive chains 28 under the proper tension. These side chains carry cross elements 31 at points spaced along its length and these cross elements are cut away or notched at 32 so as to clear the chain sections 19 of the conveyor. So that the cross elements 31 of the drive chains 28 may move upwardly into engagement with the cross flights of the conveyor the bottom plate has an opening 33 closed by a pivoted door 34. The door opens as it is engaged by the upwardly moving cross element 31, and closes automatically as the cross elements move out of engagement therewith, in an obvious manner. As the side chains 28 are orbitally circulated, the cross elements 31 engage the conveyor cross flights 18 thereby to effect orbital circulation of the endless conveyor along the guideways of the several cooperating frame sections. Mounted on a cross frame 35 on the bottom skids is a motor 36 connected by a conventional universal drive shafting 37 to conventional speed reducing gearing contained in a gear casing 38 secured to the adjacent side of the upper frame 13 of the discharge conveyor section 2, whereby the shaft 25 may be driven to effect drive of the side drive chains 28.

A feeder device is provided for the conveyor flights as the latter pass from the bottoms of the drive chains 28, comprising suitably shaped guide members 40 and 41 which cooperate to provide inclined guideways 42 along which the lower conveyor flights are guided as they move downwardly toward their stored positions within a horizontal storage space or chamber extending longitudinally of the discharge conveyor section beneath the top run of the conveyor. A transverse shaft or rod 43 extends horizontally beneath the drive chains 28 and below the lower run of the conveyor and is suitably journaled within the sides of the delivery frame portion 24, and secured to this shaft are laterally spaced dogs or arms 44 which are engageable by the lower conveyor flights as the latter move from engagement with the drive chains 28 downwardly toward the guideways 42. Secured to one end of the cross shaft 43 is a lever 45 which is pivotally connected at 46 to a link 47, the latter in turn being pivotally connected at 48 to a lever 49. This lever 49 is secured to one end of a lower cross shaft or rod 50 which extends transversely beneath the conveyor in parallelism with the upper cross shaft 43 and is likewise suitably journaled within the sides of the frame of the discharge section 2. Secured to the lower shaft are laterally spaced dogs or arms 51 which are engageable with the conveyor flights as they move downwardly along the inclined guideways 42. A spring 52 is connected between the lever 49 and a point 53 on the adjacent skid frame for urging the dogs 44 and 51 upwardly and rearwardly, and suitable stops limit rearward swing of the dogs. As the conveyor is driven, the cross flights of its return run engage the upper dogs 44 swinging the same forwardly and downwardly against the action of the spring 52, thereby effecting swinging of the lower dogs 51 through the link 47 forwardly and downwardly thereby to cause the dogs to engage the adjacent cross flight of the conveyor to feed the stored up flights forwardly along horizontal portions 54 of the guideways within the storage space or chamber. Thus, as the conveyor is driven the stored up conveyor flights are intermittently fed forwardly along their guideways within the storage space, and the stored up flights are arranged in substantial abutting relation as shown in Figs. 2 and 4 with their connecting side chain sections 19 hanging loosely in loops or bights within the storage space as indicated at 55.

The endless conveyor as it is driven has its top run moving along the guideways of the telescopically arranged conveyor frame sections and as its front receiving portion passes around the front guide roller 23, its loose lower run moves forwardly from the place of storage within the rear discharge section forwardly as indicated at 57 in Figs. 2 and 2a. The wheel frames 58 of the intermediate sections carry cross rollers 59 by which the loose lower conveyor run is guided. As the conveyor flights move forwardly from their place of storage along the guideways 54 they pass beneath a cross guide roller 60 suitably journaled on side plates 61 secured to the sides of the skid frames. Due to the storing up of the conveyor flights of the slack bottom run of the conveyor, sufficient conveyor length is provided whereby the conveyor frames may be telescoped into fully collapsed position while the top run of the conveyor at all times remains effective to convey the material, and as the conveyor frames are extended, the top conveyor run is correspondingly increased in effective length until the conveyor mechanism is extended its full length.

While the conveyor frame sections may be extended or contracted in various manners as by manually moving the same, it is herein desired to connect the receiving end of the conveying mechanism to the loading machine or other machine with which the conveyor is associated, and the front end of the front conveyor section 3 is provided with an attaching element such as an eye 62 for this purpose. Thus, the conveyor may be extended by the loading or other machine as the latter is advanced, and in a similar manner the conveyor mechanism may be contracted. If desired the rear discharge conveyor section 2 may be firmly held in position in the mine during the conveying operation as by suitable anchor jacks.

As a result of this invention an improved extensible mine conveyor mechanism is provided which may be readily extended or contracted as desired, and which may be readily moved from place to place about the mine. By the provision of a portable conveyor mechanism which is horizontally extensible the receiving end of the conveyor may be readily advanced with the loading machine as mining and loading progresses, while the rear discharge end of the conveyor remains relatively stationary with respect to the point of delivery. By storing the flights of the slack return run of the conveyor within the storage space in the discharge frame section of the conveyor mechanism the top run of the endless conveyor at all times remains effective irrespective of the adjusted length of the conveyor mechanism. The novel feeder device associated with the conveyor drive mechanism affords an extremely simple means for positively intermittently feeding the bottom conveyor flights into their stored up position within the storage space. The mechanism is relatively simple and rugged in design, and is relatively compact, well adapted for its intended purpose. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a portable extensible conveyor mechanism, the combination comprising a series of cooperating telescopically engaged horizontal conveyor frame sections cooperating to provide a horizontal troughlike passageway extending the full length of the conveyor mechanism, an endless conveyor guided for circulation relative to said conveyor frame sections and having its top run movable along said troughlike passageway, said endless conveyor being of sufficient length as to accommodate the full extended length of said conveyor frames, driving means for said conveyor, storing means embodied in an end frame section and comprising a horizontal storage space extending longitudinally of said latter section beneath the top run of said conveyor, said storing means cooperating with the return run of said conveyor for automatically storing up the slack return run of said conveyor within said storage space as said frame sections are moved toward contracted, fully collapsed position, and means cooperating with said slack return run of said conveyor for feeding the same toward stored up position within said storage space including a feeding member actuated by a driven portion of the lower return run of said conveyor, said feeding means including a driving element engaging said driven lower run of said conveyor.

2. In a portable extensible conveyor mechanism, the combination comprising a series of cooperating telescopically engaged horizontal conveyor frame sections which cooperate to provide a horizontal troughlike passageway extending the full length of the conveyor mechanism, an endless flight conveyor having spaced cross conveyor flights movable along the bottom of said frame sections and connected by flexible chain sections, said conveyor having said conveyor flights of its top run movable along said troughlike passageway for conveying the material along the full length of the conveyor mechanism, and said endless conveyor being of sufficient length as to accommodate the full extended length of said conveyor frames, driving means embodied in an end discharge section of the conveyor mechanism and engaging said conveyor at the discharge end thereof for driving said conveyor including an endless drive chain having horizontal upper and lower runs and carrying cross elements engaging the conveyor flights and a motor for driving said endless drive chain, and storing means embodied in said end discharge section and comprising a horizontal storage space extending longitudinally of said latter section beneath said top run of said conveyor, said storing means cooperating with said drive chain for automatically storing up the flights of a portion of the slack return run of said conveyor within said storage space and embodying horizontal supporting and guiding means for supporting and guiding said slack stored up portion as said frame sections are moved toward contracted, fully collapsed position.

3. A conveyor mechanism of the character set forth in claim 2 wherein feeding means is carried by the discharge frame section and is actuated by said cross elements of said drive chain for engaging the cross conveyor flights of the slack return run of said conveyor as the latter moves away from said drive chain and for intermittently feeding said cross flights into stored up relation within said storage space.

4. In a conveyor mechanism of the character set forth in claim 3 wherein the connecting chain sections between the stored up conveyor flights within said horizontal storage space hang in loops between the substantially abutting flights and said storage space within said discharge frame section receiving the stored up flights and said chain section loops.

5. In a portable extensible conveyor mechanism, the combination comprising an elongated horizontal conveyor frame composed of a series of cooperating frame sections having telescopic sliding engagement whereby the effective length of the conveyor mechanism may be varied, an endless flight conveyor guided for circulation along said conveyor frame sections with its top run moving along the full length of the conveyor mechanism, said flight conveyor comprising spaced conveyor flights connected by flexible chain sections and being of sufficient length as to accommodate the full extended length of said frame sections, means for driving said conveyor including an endless drive chain having cross elements engageable with said conveyor flights, and associated storing means including a horizontal storage space and a feeder device actuated by said conveyor flights of the return run of said conveyor for storing up the slack portion of the latter within said storage space as said conveyor frame sections are moved towards fully collapsed, contracted position.

6. A conveyor mechanism of the character set forth in claim 5 wherein said feeder device includes an oscillatory feeder element engageable with the conveyor flights as the latter move toward their stored up position within said storage space for intermittently feeding said flights into such position.

References Cited in the file of this patent

UNITED STATES PATENTS

| | | |
|---|---|---|
| 263,846 | Brown et al. | Sept. 5, 1882 |
| 358,551 | Herbert | Mar. 1, 1887 |
| 362,571 | Chase | May 10, 1887 |
| 1,453,393 | Jessen | May 1, 1923 |
| 1,557,368 | Kershaw et al. | Oct. 13, 1925 |
| 2,534,054 | Perkes | Dec. 12, 1950 |
| 2,576,217 | Eggleston | Nov. 27, 1951 |